US008170348B2

(12) United States Patent
Yokoyama

(10) Patent No.: US 8,170,348 B2
(45) Date of Patent: May 1, 2012

(54) IMAGE PROCESSING APPARATUS, IMAGE PROCESSING METHOD, COMPUTER PROGRAM FOR REALIZING FUNCTIONS THEREOF, AND RECORDING MEDIUM HAVING THE COMPUTER PROGRAM RECORDED THEREON

(75) Inventor: Issei Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 794 days.

(21) Appl. No.: 12/237,621

(22) Filed: Sep. 25, 2008

(65) Prior Publication Data
US 2009/0097752 A1  Apr. 16, 2009

(30) Foreign Application Priority Data
Oct. 11, 2007 (JP) ................. 2007-265551

(51) Int. Cl.
*G06K 9/68* (2006.01)
(52) U.S. Cl. .................................... 382/218
(58) Field of Classification Search .......... 382/181, 382/232, 238, 243, 217–219
See application file for complete search history.

(56) References Cited

U.S. PATENT DOCUMENTS
2002/0164084 A1*  11/2002  Baggs ................... 382/275
2005/0238218 A1*  10/2005  Nakamura .............. 382/128
2007/0147693 A1*   6/2007  Saito .................... 382/243

FOREIGN PATENT DOCUMENTS
JP  2005-33763 A  2/2005
* cited by examiner

*Primary Examiner* — Duy M Dang
(74) *Attorney, Agent, or Firm* — AdvantEdge Law Group, LLC

(57) ABSTRACT

An image processing apparatus determines whether a reference image and an image of interest are different or the same. A determination unit determines whether a comparative image formed by a part or entirety of the image of interest and an image corresponding to the comparative image in the reference image are different or the same. A decision unit decides whether a next comparative image should be a part or entirety of the image of interest in accordance with the result of the determination. An acquisition unit acquires the comparative image from the image of interest in accordance with result of the decision.

12 Claims, 14 Drawing Sheets

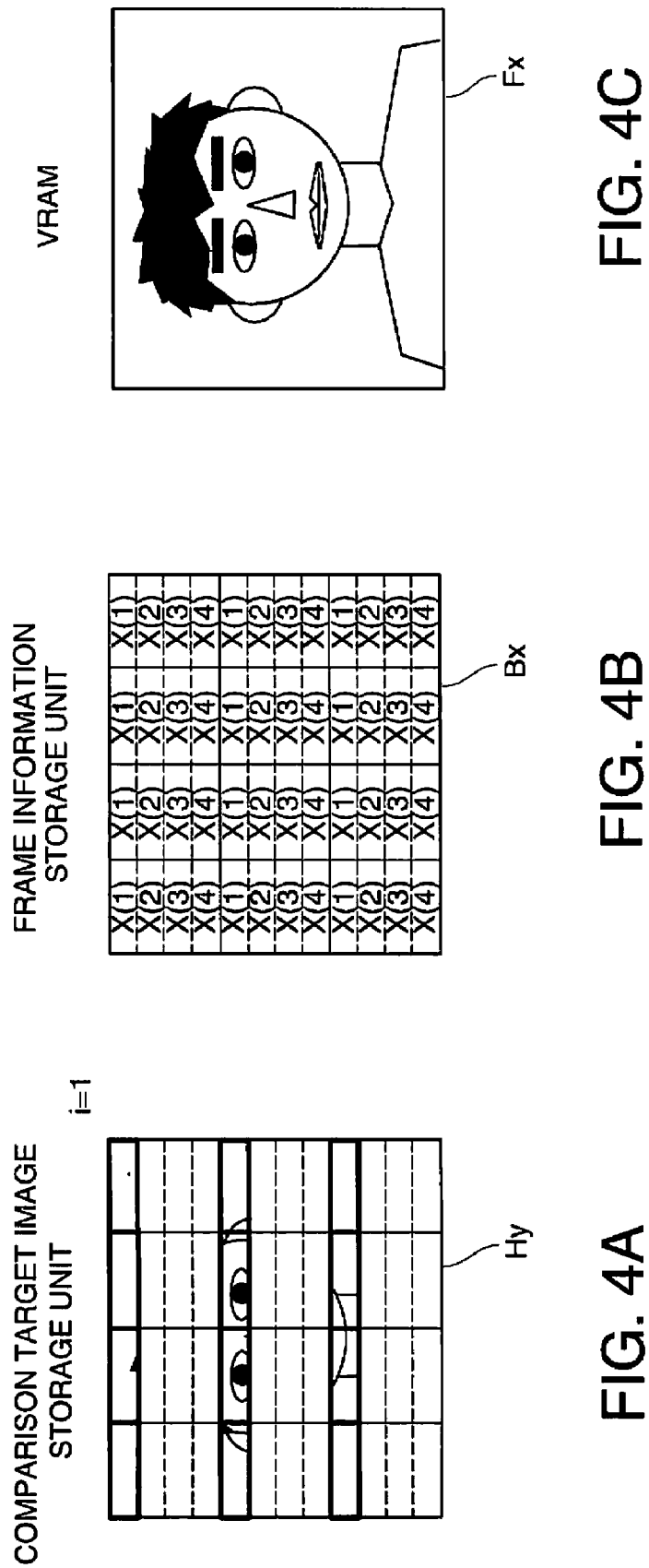

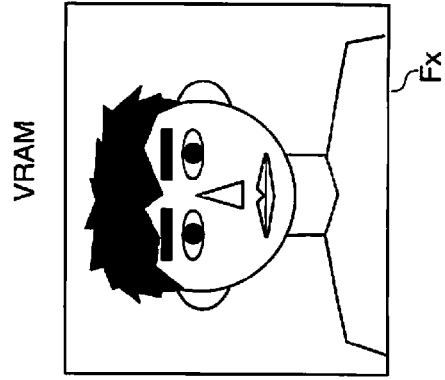
FIG. 5A
FIG. 5C
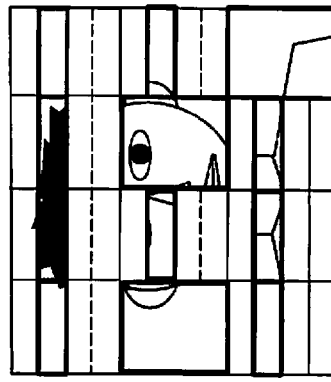
FIG. 5B
FIG. 5D

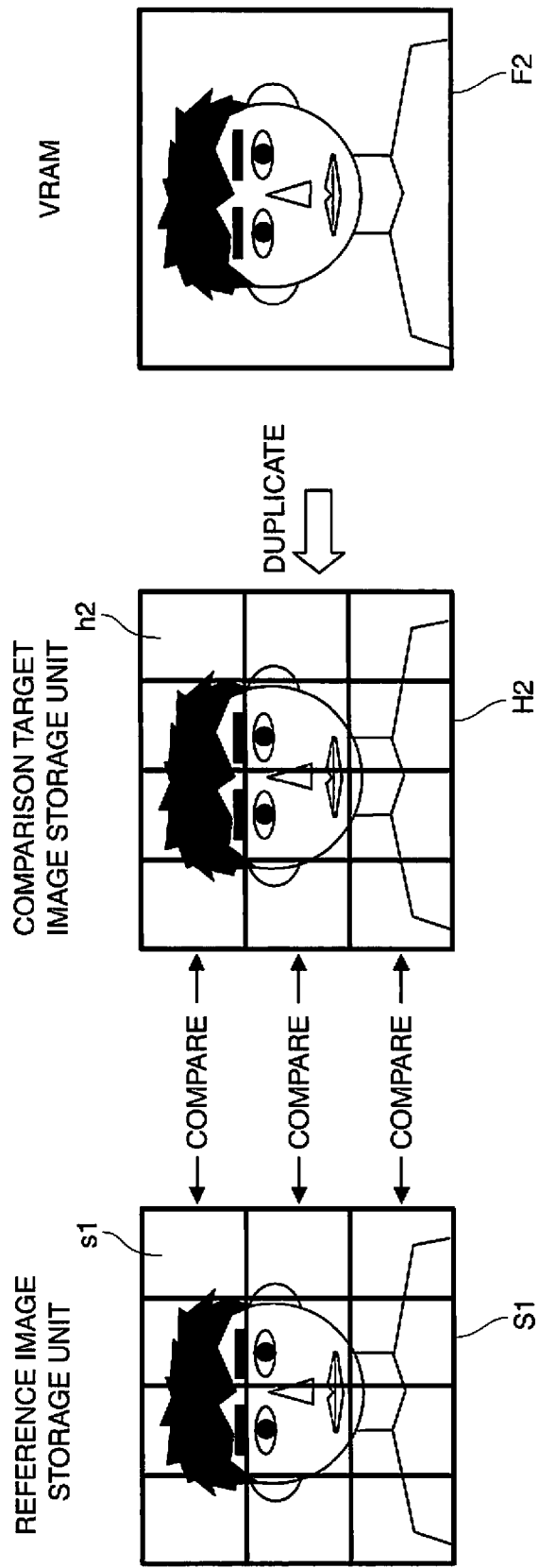

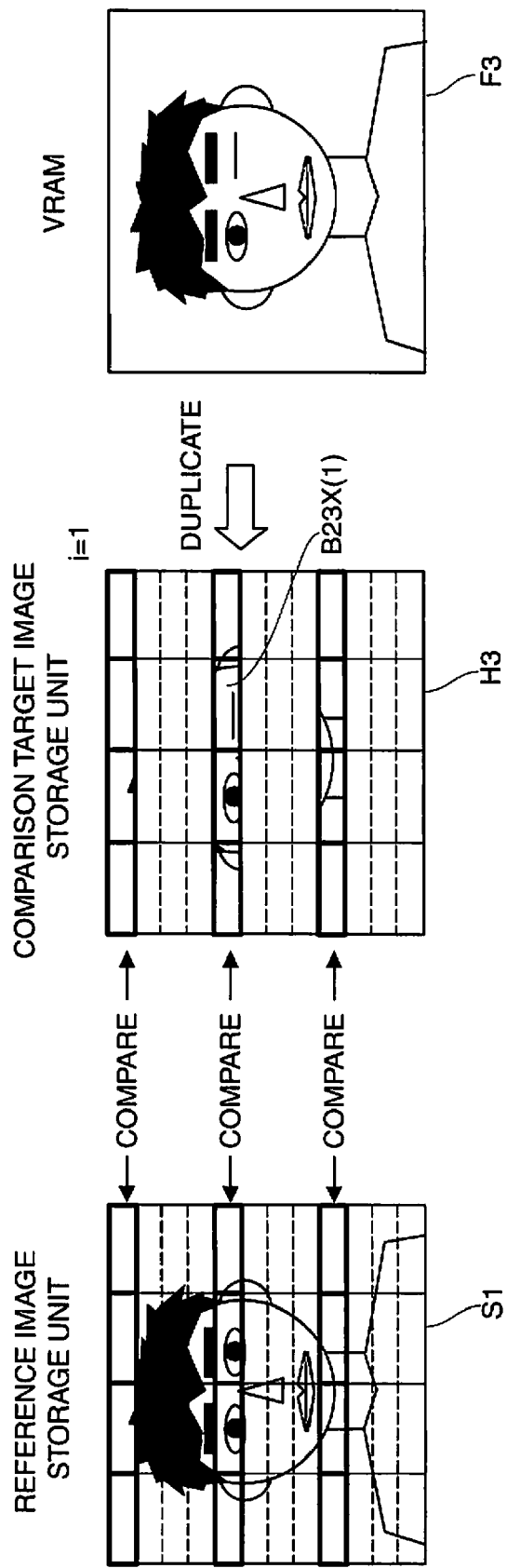

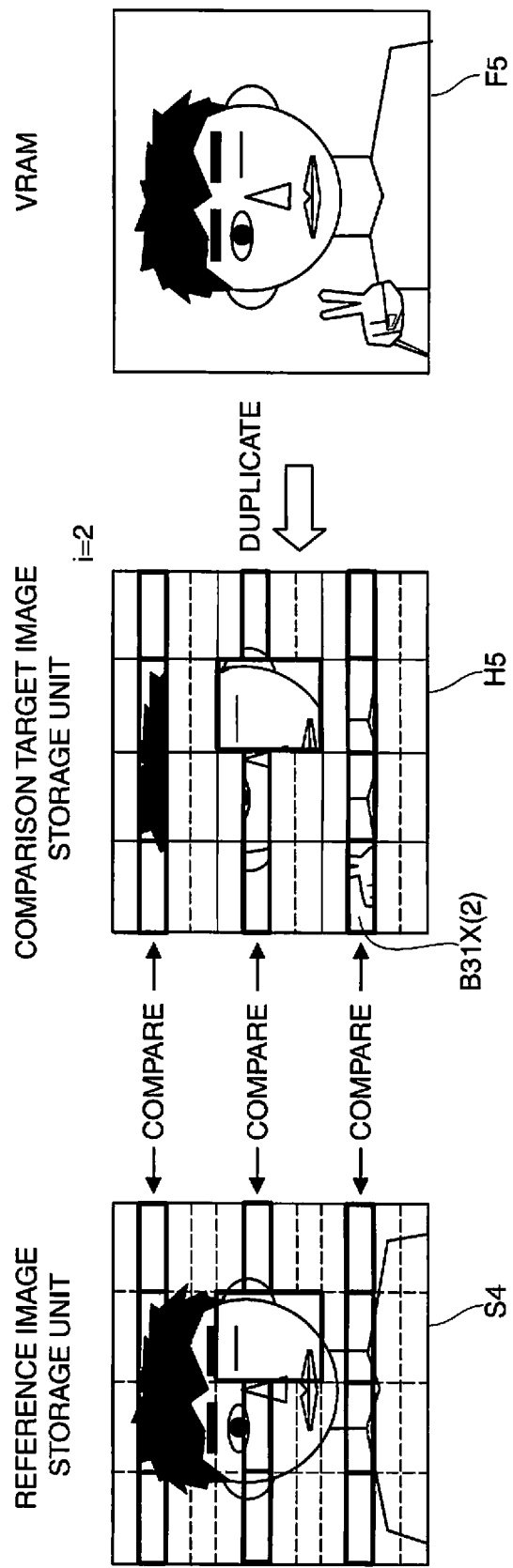

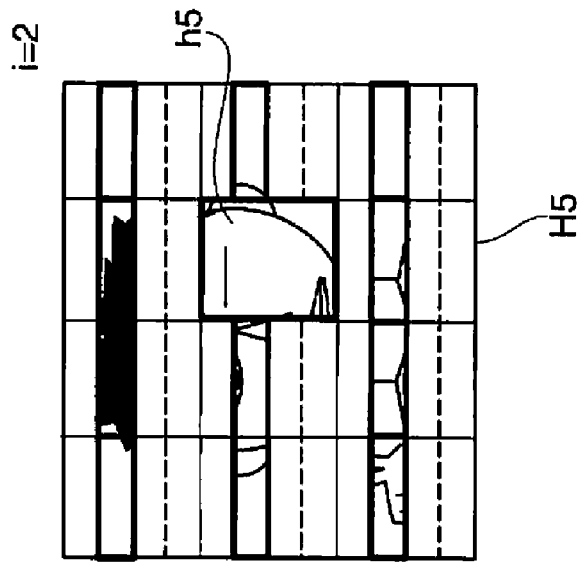
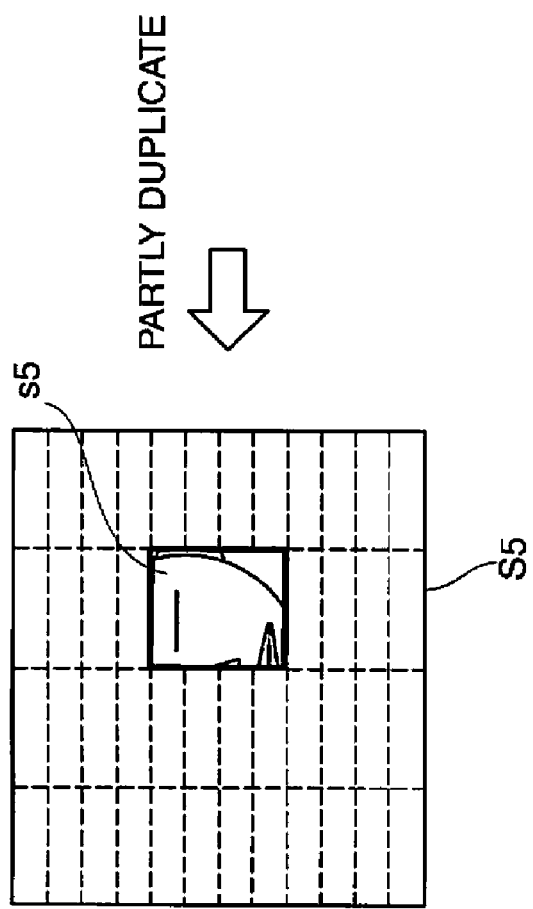
FIG. 12B
FIG. 12A

IMAGE PROCESSING APPARATUS, IMAGE PROCESSING METHOD, COMPUTER PROGRAM FOR REALIZING FUNCTIONS THEREOF, AND RECORDING MEDIUM HAVING THE COMPUTER PROGRAM RECORDED THEREON

CROSS REFERENCE TO RELATED APPLICATIONS

The present application claims priority and incorporates herein by reference in its entirety Japanese Patent Application No. 2007-265551 filed Oct. 11, 2007.

BACKGROUND

An image display system is known that allows image data to be sent from a computer to an external output device such as a projector via a LAN or the like and thus allows an image to be displayed. For such an image display system, there is known a technique of transferring only a part of image data including a changed part of the image in order to reduce the volume of data transfer from the computer to the external output device, as disclosed in Japanese Patent Publication No. JP-A-2005-33763.

However, in order to detect a change in the image, transmission of image data from a VRAM to a RAM and comparison of images by a CPU are carried out in the computer. These operations may cause a heavy load on the computer and it may take a long time before transferring image data.

SUMMARY

An embodiment of the disclosure may reduce the processing load and processing time to detect a change in the image.

According to at least one embodiment of the disclosure, an image processing apparatus is provided that determines whether a reference image and an image of interest are different or the same. The image processing apparatus according to at least one embodiment of the disclosure includes a determination unit that determines whether a comparative image formed by a part or entirety of the image of interest and an image corresponding to the comparative image in the reference image are different or the same, a decision unit that decides whether a next comparative image should be a part or entirety of the image of interest in accordance with the result of the determination, and an acquisition unit that acquires the comparative image from the image of interest in accordance with the decision.

In the image processing apparatus according to at least one embodiment of the disclosure, the comparative image formed by a part or entirety of an image of interest and the reference image are compared to determine whether these images are different or the same. Therefore, the load on the computer and the time required for processing may be reduced in detecting a change in the image, compared with the case of comparing the entirety of an image of interest with a reference image.

The image processing apparatus according to at least one embodiment of the disclosure further includes an update unit that updates the reference image in accordance with the result of the determination, and that when it is determined that the comparative image and the reference image are different, the determination unit determines whether the reference image updated by the update unit and a next comparative image are different or the same. In this case, after the determination of whether the reference image and the comparative image are different or the same, it may be further determined whether the updated reference image and the next comparative image are different or the same.

The image processing apparatus, according to at least one embodiment of the disclosure, includes a decision unit that when it is determined by the determination unit that the comparative image and the reference image are the same, the decision unit decides a part of the image of interest as a next comparative image, and when it is determined that the comparative image and the reference image are different, the decision unit decides the entirety of the image of interest as a next comparative image. In this case, after the determination of whether the comparative image and the reference image are different or the same, the determination unit may further determine whether the comparative image formed by a part or entirety of the image of interest in accordance with the result of the determination and the reference image are different or the same.

The image processing apparatus according to at least one embodiment of the disclosure further includes an update unit configured to update, when the comparative image determined as being different or the same by the determination unit is the entirety of the image of interest, the reference image by using the comparative image. In this case, the reference image may be updated using the comparative image acquired by the acquisition unit.

The image processing apparatus according to at least one embodiment of the disclosure that includes a decision unit configured to decide, when a part of the image of interest is decided as the comparative image, one of plural divided areas of the image of interest that is divided in the divided areas, as the comparative image. In this case, the decision unit may decide either one of the plural divided areas or the entirety of the image of interest as the comparative image.

One image processing apparatus according to an embodiment of the disclosure includes a decision unit that when determined by the determination unit that the comparative image formed by one of the divided areas is the same as the reference image, the decision unit decides a different divided area from the divided area used for the determination, as a next comparative image. In this case, the determination unit may determine whether the different area from the divided area used for the determination and the reference image are different or the same.

The image processing apparatus according to at least one embodiment of the disclosure determines whether an overall image of interest formed by plural images of the images of interest and an overall reference image formed by plural images of the reference images are different or the same. In this case, the image processing apparatus may determine whether each image of interest forming the overall image of interest and each reference image forming the overall reference image are different or the same, thereby determining whether the overall image of interest and the overall reference image are different or the same.

The image processing apparatus according to at least one embodiment of the disclosure includes an update unit, when it is determined by the determination unit that the comparative image and the reference image are different in at least one or more images of interest forming the overall image of interest, to update all the reference images forming the overall reference image. In this case, when at least a part of the image is different between the overall image of interest and the overall reference image, the overall reference image may be updated.

It is also preferable that in the image processing apparatus according to at least one embodiment of the disclosure, the acquisition unit selects an image of interest from plural images arrayed in time series. In this case, a change in the images arrayed in time series may be detected in accordance with the determination of whether the image of interest and the reference image are different or the same.

The image processing apparatus according to at least one embodiment of the disclosure further includes a transmission unit that transmits the reference image to outside. In this case, the reference image updated by the update unit or the overall reference image formed by plural reference images may be transmitted to outside.

Various embodiments in the disclosure include at least one image processing method for executing image processing. Other embodiments in the disclosure include a computer program for realizing the functions of the apparatus, a recording medium having the computer program recorded thereon, and so on.

BRIEF DESCRIPTION OF THE DRAWINGS

Embodiments of the disclosure are described with reference to the accompanying drawings, wherein like reference numbers designate like elements.

FIGS. 4A to 4C are explanatory views schematically showing areas formed by subdividing block areas.

FIGS. 5A to 5D are explanatory views schematically showing the state of block areas set by a CPU.

FIGS. 9A to 9C are explanatory views schematically showing comparison target image data and overall reference image data.

FIGS. 10A to 10C are explanatory views schematically showing comparison target image data and overall reference image data acquired by the CPU in a non-active state.

FIGS. 11A to 11C are explanatory views schematically showing comparison target image data and overall reference image data acquired by the CPU in a partially active state.

FIG. 12 is an explanatory view schematically showing the state where overall reference image data is acquired from comparison target image data.

FIGS. 14A to 14F are explanatory views of block areas and flip areas in modified embodiments.

DESCRIPTION OF EMBODIMENTS

Figure 1:
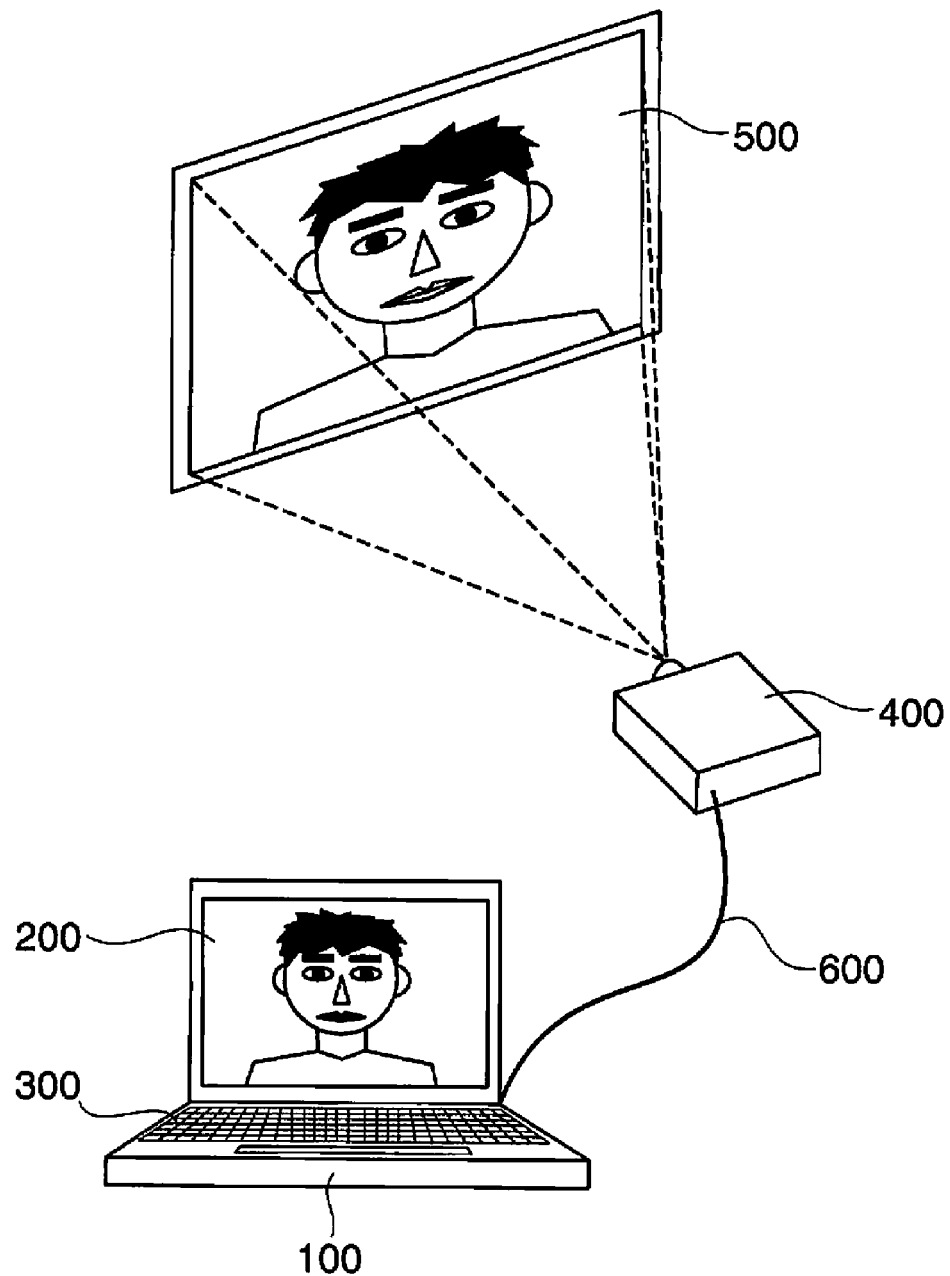
FIG. 1 is an explanatory view showing the schematic configuration of a video provision system to which an image processing apparatus is applied.

In the following detailed description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure. The meaning of "in" may include "in" and "on." The appearances of the phrases "in one embodiment" or "in an embodiment" in various places in the specification do not necessarily all refer to the same embodiment, but it may.

As used herein, the term "software" refers broadly to any set of computer readable instructions embodied on one or more computer readable media, the instructions being executable by a computing device. Software may include one or more computer programs or applications. Data related to software may include configuration data such as file system and registry data associated with the software, including data representative of file system and configuration activity associated with operation and/or installation of the software.

As used herein, the terms "processor", "generator", "controller", and "transmitter" refer broadly to devices consisting of any set of circuits, general purpose processors (e.g., microprocessors, micro-controllers, an ASIC, or digital signal processors (DSPs)), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions configured to perform the action described. The executable instructions may be embodied in firmware logic, reconfigurable logic, a hardware description language, a state machine, an application-specific integrated circuit (ASIC), or combinations thereof. The appearances of each of these terms in various places in the specification do not necessarily all refer to the same embodiment of that device, but it may. Moreover, in various embodiments each "processor", "generator", "controller", and "transmitter" device may share some common components with other devices in an image transmission apparatus.

Hereinafter, an image processing apparatus according to embodiments of the disclosure will be described with reference to the drawings. Several embodiments will be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment.

A. Embodiment

A-1. Overall Configuration of Image Processing Apparatus

FIG. 1 is an explanatory view showing the schematic configuration of a video provision system to which an image processing apparatus is applied as one embodiment of the disclosure. A video provision system 1000 includes a personal computer 100, a projector 400, and a screen 500. In this video provision system 1000, the projector 400 receives data of an image displayed on a display 200 provided in the personal computer 100 and projects and displays the image onto the screen 500.

In one embodiment, transmission and reception of image data between the personal computer 100 and the projector 400 are carried out via a LAN cable 600. Transmission and reception of data may be carried out via a USB, wireless LAN, Bluetooth (trademark registered) and so on, as well as via the LAN cable. The projector 400 drives a liquid crystal panel, not shown, in accordance with the received image data to modulate illuminating light that exits a light source, and thus projects and displays the image. The projector 400 is not limited to a liquid crystal panel. An arbitrary optical modulator may be used. For example, a DMD (Digital Micromirror Device, a trademark registered of Texas Instruments of the United States) may be used as well.

Figure 2:
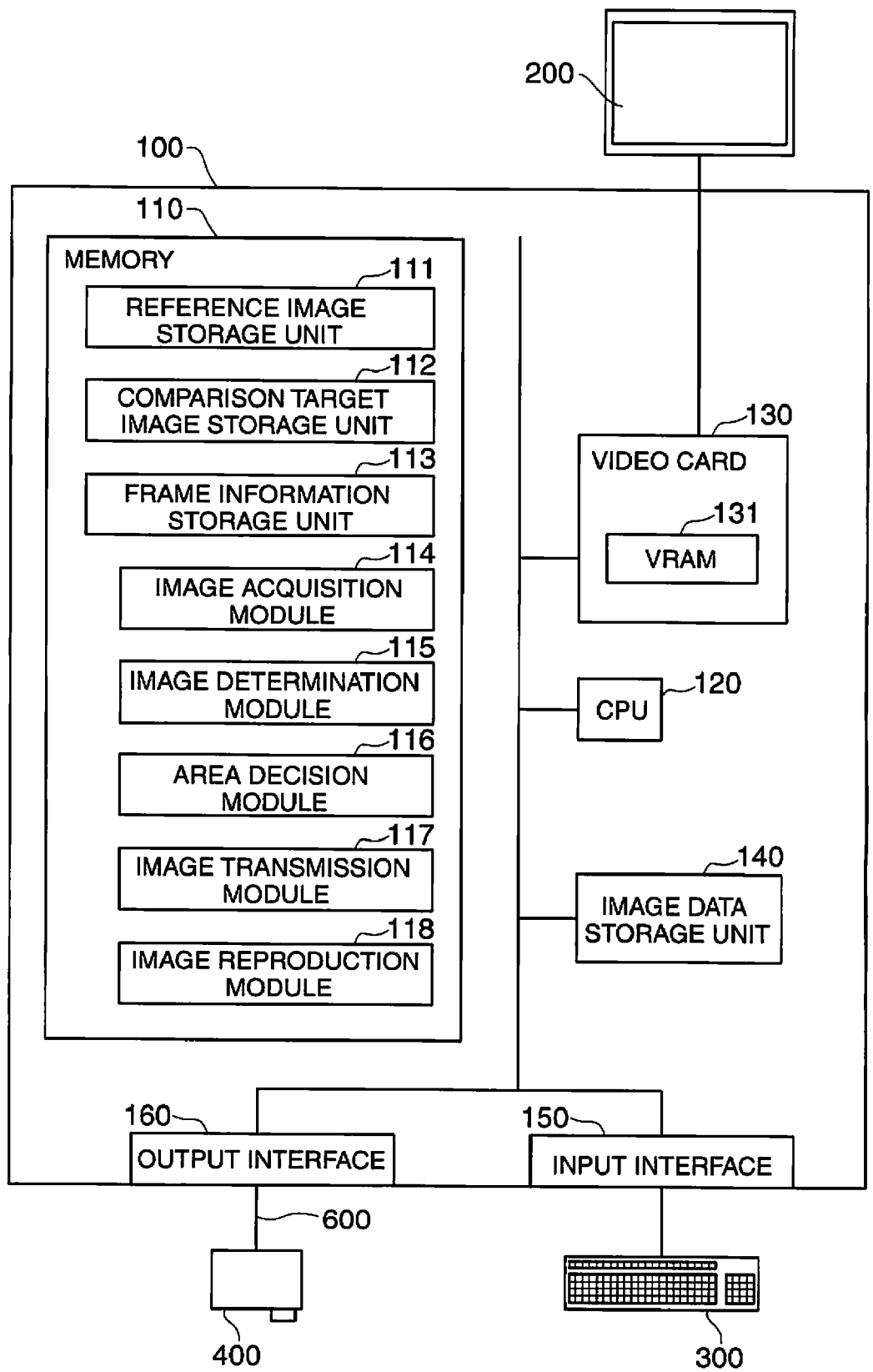
FIG. 2 is a block diagram showing the internal configuration of a personal computer 100.

FIG. 2 is a block diagram showing the internal configuration of the personal computer 100. The personal computer 100 has a memory 110, a CPU 120, a video card 130, an image data storage unit 140, an input interface 150, and an output interface 160.

The CPU 120 is a central processing unit, which controls the overall operations of the personal computer 100. The memory 110 includes a ROM or RAM. The memory 110 functions as a reference image storage unit 111, a comparison target image storage unit 112, or a frame information storage unit 113, as will be described later. The memory 110 also has an image acquisition module 114, an image determination module 115, an area decision module 116, an image transmission module 117, and an image reproduction module 118.

The reference image storage unit 111 and the comparison target image storage unit 112 are areas on the memory for storing image data. The frame information storage unit 113 is an area on the memory for storing area frame data, which will be described later. The image acquisition module 114, the image determination module 115, the area decision module 116, the image transmission module 117, and the image reproduction module 118 are programs to cause the CPU 120 to execute specific processing. Although these modules are configured as software in one embodiment, they may also be realized by hardware such as an integrated circuit.

The video card 130 has a VRAM (Video RAM) 131 used as a frame memory. In the VRAM 131, image data equivalent to one frame of an image to be displayed on the display 200 may be drawn. The image data storage unit 140 is a storage device such as a hard disk drive and stores dynamic image data including plural frame image data.

The input interface 150 is connected to a keyboard 300 and provides input data from the keyboard 300 to the CPU 120. The output interface 160 is connected to the projector 400 via the LAN cable 600 and enables transmission of image data from the personal computer 100 to the projector 400.

The CPU 120 executes the image acquisition module 114 and thereby functions as an acquisition unit that duplicates image data drawn in the VRAM 131 and stores the duplicated image data into the reference image storage unit 111 and the comparison target image storage unit 112. The CPU 120 also executes the image determination module 115 and thereby functions as a determination unit that determines whether overall reference image data and comparison target image data are different or the same. The CPU 120 also executes the area decision module 116 and thereby functions as a decision unit that decides the range of image data to be duplicated from the image data drawn in the VRAM 131, in accordance with area frame data, which will be described later. The CPU 120 also executes the image transmission module 117 and thereby functions as a transmission unit that transmits the image data stored in the reference image storage unit 111 to an external device via the output interface 160. The CPU 120 also executes the image reproduction module 118. Thus, the CPU 120 causes the image data stored in the image data storage unit 140 to be drawn in the VRAM 131 and thereby causes the image to be displayed on the display 200.

A-2. Image Acquisition Method Based on Area Frame Data

Figure 3C:
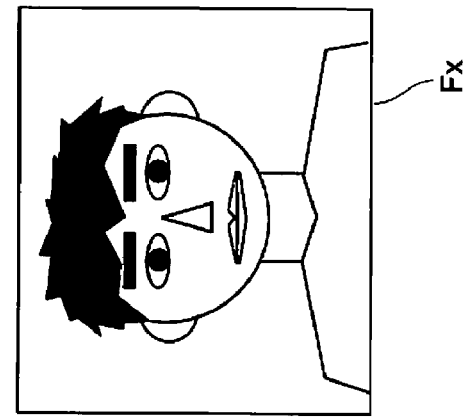
FIGS. 3A to 3C are explanatory views schematically showing area frame data.
Figure 3B:
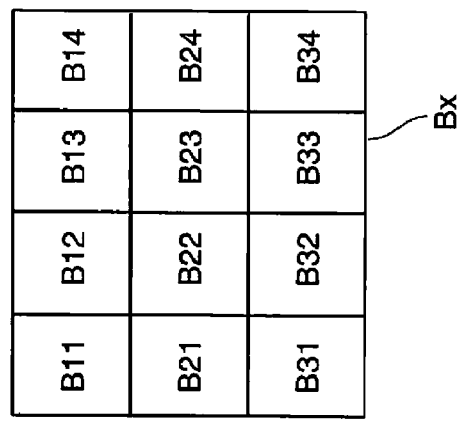
Figure 3A:
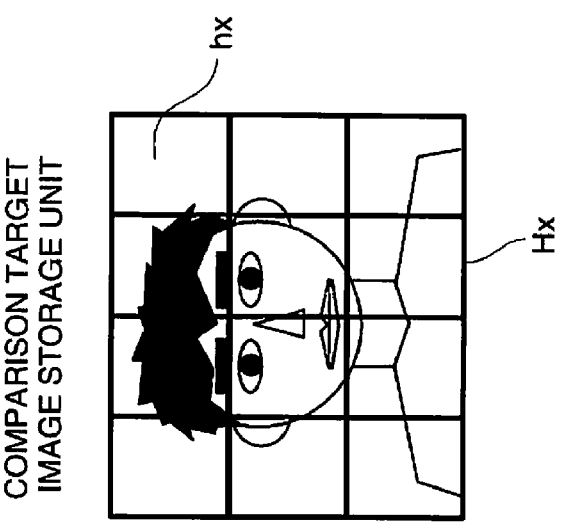

A method of specifying the range of an image to be duplicated from image data drawn in the VRAM 131 in accordance with area frame data will be described. FIGS. 3A to 3C are explanatory views schematically showing area frame data. Area frame data Bx shown in FIG. 3B has an area corresponding to frame image data Fx drawn in the VRAM 131 shown in FIG. 3C and shows the range of image data to be duplicated from the frame image data Fx. The area frame data Bx includes 12 block areas B11 to B34 that divide the frame image data in the VRAM 131. With reference to the area frame data Bx, the CPU 120 duplicates image data corresponding to the block areas B11 to B34 of the frame image data Fx drawn in the VRAM 131, and stores the duplicated image data into the comparison target image storage unit 112.

As shown in FIG. 3A, the comparison target image storage unit 112 stores comparison target image data Hx duplicated for each of the block areas B11 to B34 from the frame image data Fx drawn in the VRAM 131. The comparison target image data Hx includes 12 comparative image data hx corresponding to each of the block areas B11 to B34. In one embodiment, an image represented by the comparative image data hx is a comparative image described in the attached claims. In one embodiment, image data stored in the reference image storage unit 111 is called overall reference image data, and image data of each block area forming the overall reference image data is called reference image data. An image represented by this reference image data is a reference image described in the attached claims. An image formed by the frame image data Fx drawn in the VRAM 131 is an overall image of interest described in the attached claims, and an image corresponding to one block area is an image of interest.

FIGS. 4A to 4C are explanatory views schematically showing areas formed by subdividing the block areas. As shown in FIG. 4B, each of the block areas B11 to B34 forming the area frame data Bx has four flip areas X(1) to X(4). FIG. 4A shows comparison target image data Hy in which only the image data in the flip areas X(1) of the frame image data Fx drawn in the VRAM 131 are duplicated. As shown in FIG. 4A, no image data exists in the other areas than the flip areas X(1). The flip areas X(1) to X(4) are divided areas described in the attached claims.

FIGS. 5A to 5D are explanatory views schematically showing the state of block areas set by the CPU. As shown in FIG. 5A, each block area of the area frame data Bx is separately set to either an active state or a non-active state by the CPU 120. An active state is set by the CPU 120 in a block area having a difference in image data when the comparison target image data and the overall reference image data are compared with each other for each block area by the CPU 120. On the other hand, a non-active state is set by the CPU 120 to a block area having no difference in image data.

In one embodiment, in a block area that is set to an active state by the CPU 120, image data of the entire block area is duplicated from the frame image data Fx drawn in the VRAM 131 and is used as comparative image data. In a block area that is set to a non-active state, only the image data in one of the flip areas X(1) to X(4) is duplicated and is used as comparative image data.

For example, when the block areas B21, B23 and B34 are set to an active state and the other blocks are set to a non-active state by the CPU, as shown in FIG. 5A, the frame image data Fx in the areas shown in FIG. 5C are duplicated to create comparison target image data. FIG. 5B shows the created comparison target image data Hz. The image of the entire block area exists in the block areas B21, B23 and B34, whereas only the image data corresponding to the flip area X(2) exists in the other block areas.

A-3. Operations of Image Processing Apparatus

Figure 6:
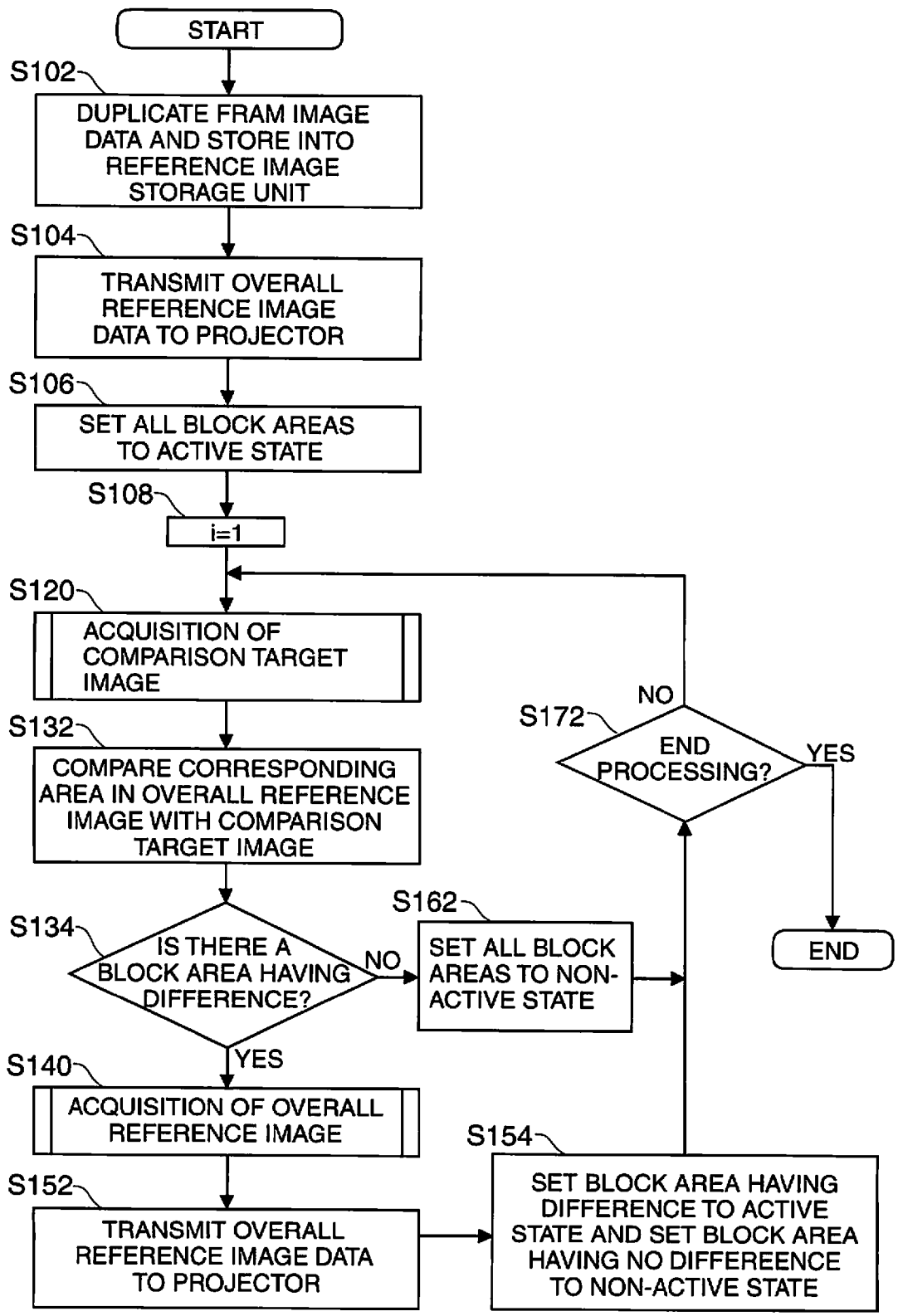
FIG. 6 is a flowchart showing procedures of an operation of the video provision system.
Figure 7:
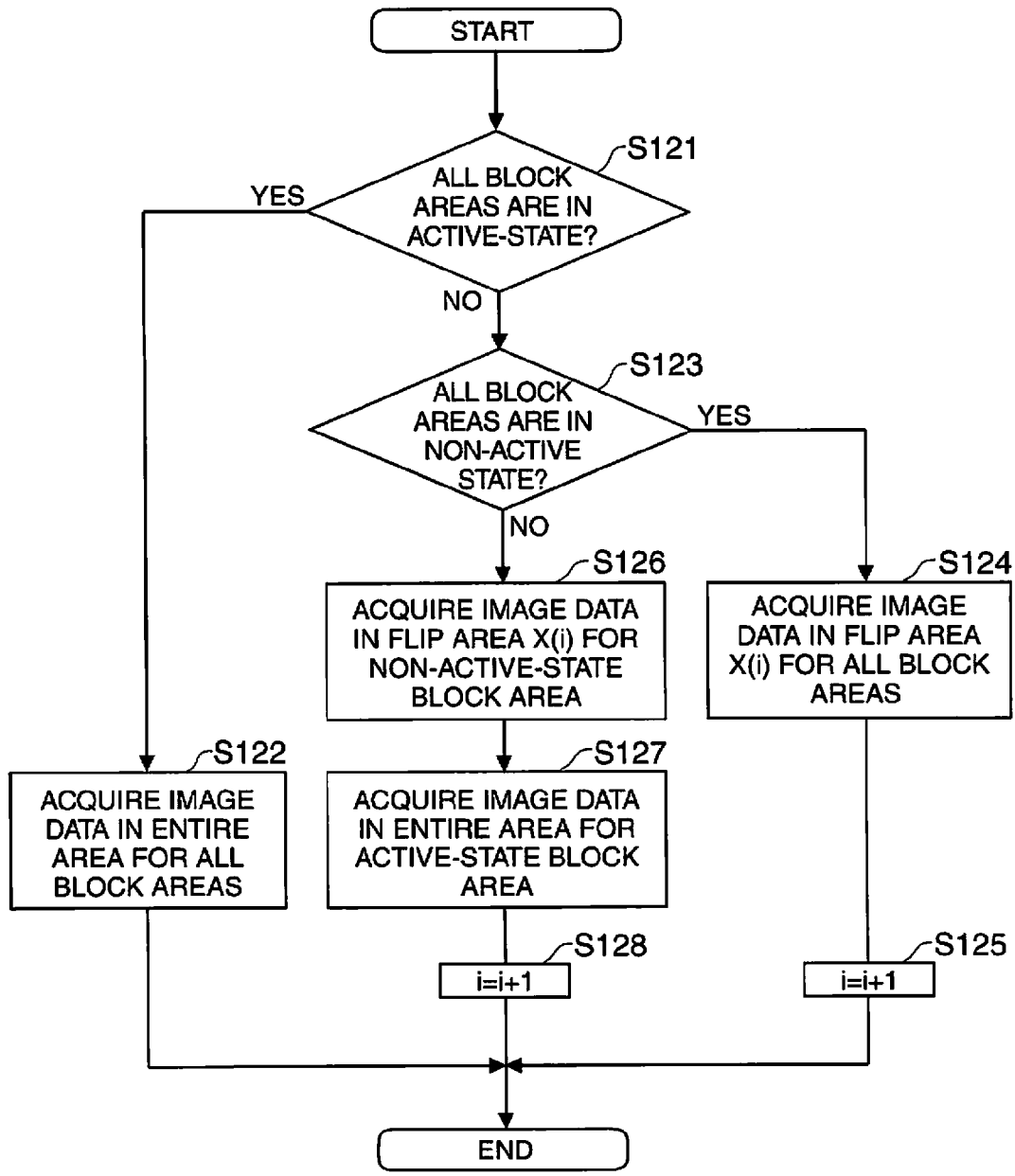
FIG. 7 is a flowchart showing procedures to acquire comparison target image data.
Figure 8:
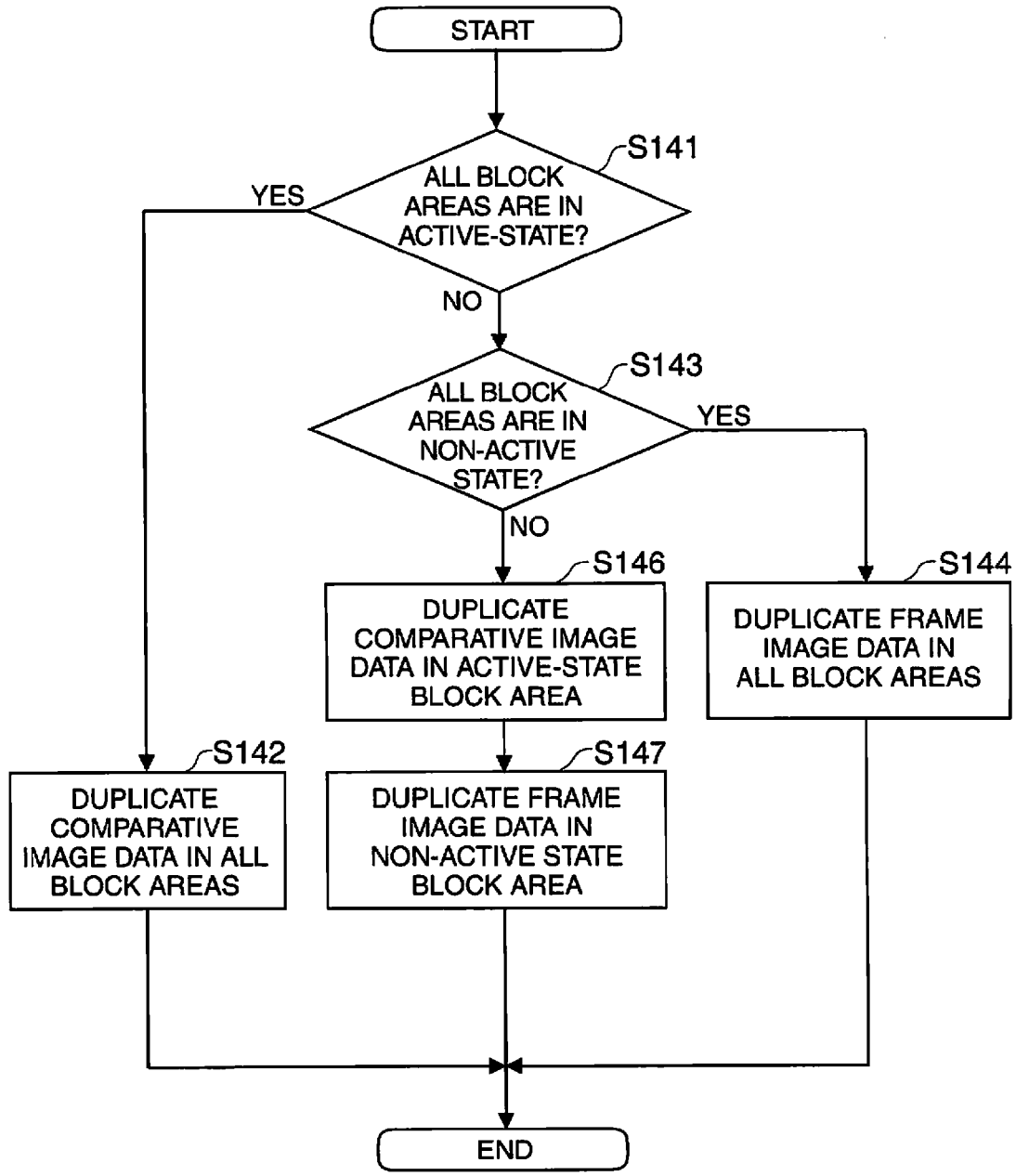
FIG. 8 is a flowchart showing procedures to acquire overall reference image data.

Turning now to FIGS. 6-8, methods and various operations of the video provision system to which the image processing apparatus is applied, in accordance with at least one embodiment, are described in terms of firmware, software, and/or hardware with reference to flowcharts and/or flow diagrams. More specifically, FIG. 6 is a flowchart showing procedures of an operation of the video provision system. FIG. 7 is a flowchart showing procedures to acquire comparison target image data. FIG. 8 is a flowchart showing procedures to acquire overall reference image data. FIGS. 9A to 9C are explanatory views schematically showing comparison target image data and overall reference image data. Describing a method and/or various operations by reference to a flowchart enables one skilled in the art to develop programs, including instructions to carry out the methods on suitably configured computer systems and electronic devices. In various embodiments, portions of the operations to be performed by an electronic device or computer system may constitute circuits, general purpose processors (e.g., micro-processors, micro-controllers, an ASIC, or digital signal processors (DSPs)), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions. The executable instructions may be embodied in firmware logic, reconfigurable logic, a hardware description language, a state machine, an application-specific integrated circuit (ASIC), or combinations thereof.

With respect to various embodiments using a software implementation (e.g., a hardware simulator), at least one of the processors of a suitably configured electronic communication device, such as a computer, executes the instructions from a storage medium. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a device causes the processor of the computer to perform an action or a produce a result.

As previously indicated, in one embodiment the CPU 120 sequentially draws image data stored in the image data storage unit 140 into the VRAM 131 and causes the image data to be continuously displayed on the display 200. In step S102 of the flowchart, the CPU 120 duplicates frame image data stored in the VRAM 131, stores the duplicated image data into the reference image storage unit 111, and uses the image data as overall reference image data S1 shown in FIG. 9A.

Subsequently in step S104 of the flowchart, the CPU 120 transmits the overall reference image data S1 stored in the reference image storage unit 111 to the projector 400 via the LAN cable 600 from the output interface 160. The projector 400 projects and displays an image on the screen 500 in accordance with the received overall reference image data S1.

In step S106 of the flowchart, the CPU 120 sets all the block areas to an active state. The CPU 120 sets an initial value i=1 in a counter i capable of storing integers 1 to 4 in step S108 of the flowchart. This counter i may increment the counter value one by one. When the counter value reaches 4, it then returns to 1. An integer i stored in this counter i corresponds to a flip area X(i), where i=1 to 4. The CPU 120 decides the flip area X(i) that is a range where image data should be acquired, with reference to the integer i.

In step S120 of the flowchart, the CPU 120 executes acquisition of a comparison target image. The acquisition of a comparison target image will now be described in further detail with reference to one embodiment as shown in FIG. 7. When it is determined that all the block areas are set to an active state, such as when the response to the query in step S121 of the flowchart is YES, the CPU 120 duplicates image data in the entirety of each block area from the frame image data in the VRAM and stores the duplicated image data into the comparison target image storage unit 112 in step S122 of the flowchart. When it is determined that all the block areas are not in an active state, such as when the response to the query in step S121 of the flowchart is NO, and that all the block areas are set to a non-active state, such as when the response to the query in step S123 of the flowchart is YES, the CPU 120 duplicates frame image data in the VRAM corresponding to the flip area X(i), where i=1 to 4, and stores the duplicated image data into the comparison target image storage unit 112 in step S124 of the flowchart. After that, i is incremented in step S125 of the flowchart.

When it is determined that block areas that are set to an active state and a non-active state exist in a mixed manner, such as when the response to the query in step S123 of the flowchart is NO, the CPU 120 duplicates image data in the entirety of the block areas set to an active state and stores the duplicated image data into the comparison target image storage unit 112 in step S126 of the flowchart. As for the blocks set to a non-active state, the CPU 120 duplicates frame image data in the VRAM corresponding to the flip area X(i), where i=1 to 4, and stores the duplicated image data into the comparison target image storage unit 112 in step S127 of the flowchart. After that, i is incremented in step S128 of the flowchart.

Returning to FIG. 6, when all the block areas are set to an active state in step S106 of the flowchart, the CPU 120 duplicates the entirety of frame image data F2 stored in the VRAM 131 and uses this frame image data as comparison target image data H2, as shown in FIG. 9B, in the acquisition of a comparison target image.

The CPU 120 compares the comparison target image data H2 with the overall reference image data S1 and determines whether these images are different or the same in step S132 of the flowchart illustrated in FIG. 6. Specifically, the CPU 120 compares the pixel value of comparative image data h2 in each block area forming the comparison target image data H2 with the pixel value of reference image data s1 in each block area forming the overall reference image data S1 and thereby determines whether the images are different or not.

When it is determined that there is no block area having a difference between the comparative target image data H2 and the overall reference image data S1, such as when the response is NO to the query in step S134, the CPU 120 sets all the block areas to a non-active state in step S162.

The CPU 120 ends the processing, for example, when a command to end the processing is received, such as when the response is YES to the query in step S172. When there is no command to end, or when the processing is not intended to end as a command to continue the processing is received, such as when the response is NO to the query in step S172, the CPU 120 executes the acquisition of a comparison target image again in step S120.

FIGS. 10A to 10C are explanatory views schematically showing the comparison target image data and the overall reference image data acquired by the CPU in a non-active state. Since all the block areas are set to a non-active state by the CPU 120 in step S162, the CPU 120 duplicates the image data in the flip area X(1) of the frame image data F3 in the VRAM 131 with respect to all the block areas and uses the duplicated image data as comparison target image data H3, as shown in FIG. 10B and step S124 of FIG. 7. After incrementing i to i=2 in step S125, the CPU 120 compares the comparison target image data H3 with the overall reference image data S1 in step S132 of FIG. 6. When it is determined that the image data in the flip area X(1) of the block area B23 is different from the overall reference image data S1, such as when the response is YES to the query in step S134, the CPU 120 executes acquisition of an overall reference image in step S140, which will be described in additional detail later.

The acquisition of an overall reference image in accordance with one embodiment will now be described with reference to FIG. 8. When it is determined that all the block areas are set to an active state, such as when the response is YES to the query in step S141, the CPU 120 duplicates the comparison target image data and stores the duplicated image data into the reference image storage unit 111, thereby using this image data as overall reference image data in step S142. When it is determined that all the block areas are not in an active state, such as when the response is NO to the query in step S141, and that all the block areas are set to a non-active state, such as when the response is YES to the query in step S143, the CPU 120 duplicates the frame image data drawn in the VRAM 131 and stores the duplicated image data into the reference image storage unit 111, thereby using this image data as overall reference image data in step S144.

When it is determined that block areas that are set to an active state and a non-active state exist in a mixed manner, such as when the response is NO to the query in step S143, the CPU 120 duplicates comparative image data in the block areas set to an active state and stores the duplicated image data into the reference image storage unit 111, thereby using this image data as reference image data in step S146. In the block areas set to a non-active state, the CPU 120 duplicates image data corresponding to the block area, of the frame image data drawn in the VRAM 131, and stores the duplicated image data into the reference image storage unit 111, thereby using this image data as reference image data in step S147. The CPU 120 combines these two kinds of reference image data and thereby produces overall reference image data.

The comparison target image data H3 shown in FIG. 10B is image data acquired by the CPU 120 in the state where all the block areas are set to a non-active state. Therefore, the CPU 120 duplicates the frame image data F4 drawn in the VRAM 131 and uses this duplicated image data as overall reference image data S4 in step S144 of FIG. 8. The CPU 120 transmits the new overall reference image data S4 to the projector 400 in step S152 of FIG. 6. The CPU 120 sets the block area B23 having a difference in pixel value in the comparison between the comparison target image data H3 and the overall reference image data S1, to an active state, and sets the block areas having no difference in pixel value to a non-active state in step S154.

FIGS. 11A to 11C are explanatory views schematically showing the comparison target image data and the overall reference image data acquired by the CPU in a partially active state. In step S154 of FIG. 6, the CPU 120 sets the block area B23 to an active state. Therefore, comparison target image data H5 is formed by duplicating the image data in the entire block area B23 and the image data in the flip areas X(2) having i=2 of the other block areas, of frame image data F5, as shown in FIG. 11B and in step S120 of FIG. 6. The CPU 120 compares the overall reference image data S4 with the comparison target image data H5 in step S132.

Figures 13A, 13B:
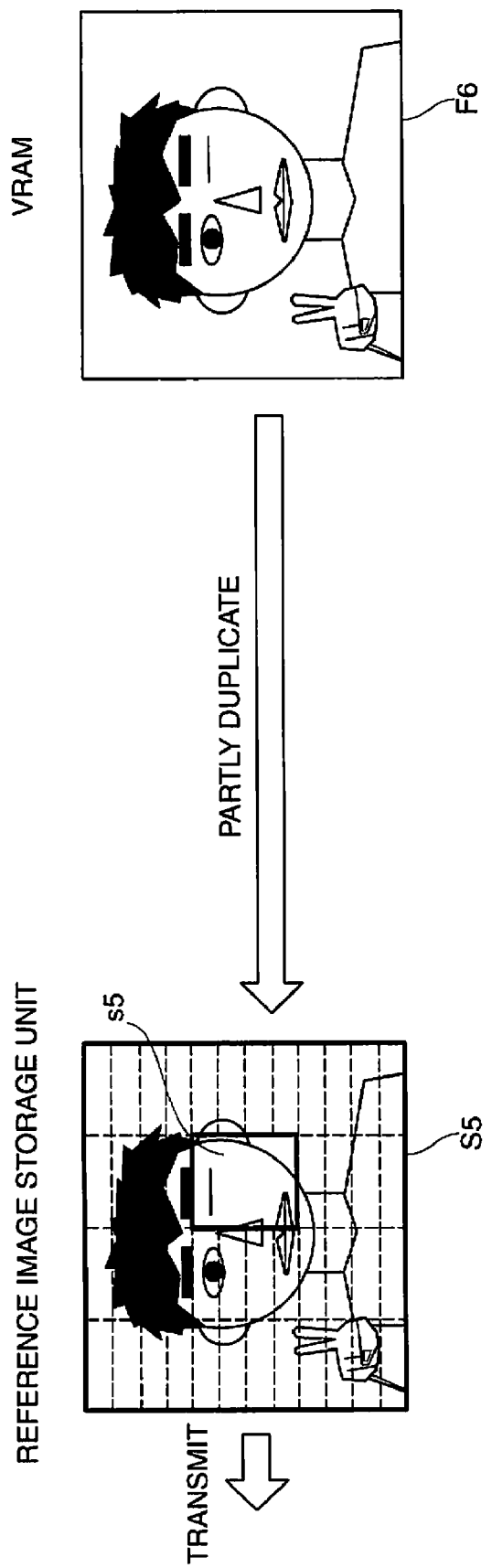
FIG. 13 is an explanatory view schematically showing the state where overall reference image data is acquired from frame image data.

When it is determined that there is a difference in the block area B31 in the comparison between the overall reference image data S4 and the comparison target image data H5, such as when the response is YES to the query in step S134, the CPU 120 acquires the overall reference image data in an overall reference image acquisition process. FIG. 12 is an explanatory view schematically showing the state where the overall reference image data is acquired from the comparison target image data. FIG. 13 is an explanatory view schematically showing the state where the overall reference image data is acquired from the frame image data.

As shown in FIG. 12, the CPU 120 duplicates comparative image data h5 of the comparison target image data H5 with respect to the block area B23 set to an active state and uses the duplicated comparative image data as reference image data s5 in the overall reference image data S5 in step S146. With respect to the other block areas set to a non-active state, the CPU 120 duplicates images data in the other areas than the block area B23, of new frame image data F6 drawn in the VRAM 131, and stores the duplicated image data into the reference image storage unit 111, as shown in FIG. 13. The CPU 120 produces the overall reference image data S5 by using these two kinds of image data. The CPU 120 transmits the overall reference image data S5 to the projector in step S152 of FIG. 6. The CPU 120 sets the block area B23 having no difference in the image to a non-active state and sets the block area B31 having a difference in the image to an active state in step S154 of FIG. 6. As a command to end the processing is received, the CPU 120 ends the processing, such as when the response is YES to the query in step S172.

In the image processing apparatus according to the embodiment, for detecting a change in the image due to frame image data drawn in the VRAM, a part or entirety of the frame image data divided into flip areas is used as comparative image data and is compared with reference image data. Therefore, the processing load may be reduced in determining whether images are different or the same, compared with the case where the entire frame image data is compared with the reference image data.

In the image processing apparatus according to the embodiment, since reference image data is updated when there is a difference between the reference image data and comparative image data, the difference between the updated reference image data and the comparative image data may be determined.

In the image processing apparatus according to the embodiment, when frame image data drawn in the VRAM is duplicated and used as comparative image data, since another change is highly likely to occur in an area where the image is changed once, image data in the entire block area that has a change is duplicated and image data in one flip area of the block area having no change is duplicated. Therefore, in continuously comparing comparative image data with reference image data, an area where image data should be duplicated from frame image data of comparative image data may be changed in accordance with the result of the previous comparison. With respect to an area where image data in the entire block area is acquired, the acquired image data is transmitted to outside and therefore the processing load due to re-acquisition of the image data from the VRAM may be reduced.

In the image processing apparatus according to the embodiment, comparative image data is duplicated to form reference image data. Therefore, the processing load due to duplication of frame image data in the VRAM may be reduced.

In the image processing apparatus according to the embodiment, i is incremented by 1 every time it is determined whether reference image data and comparative image data are different or the same. Therefore, it may be determined whether reference image data and comparative image data are different or the same, with respect to a flip area that is different from the flip area in the previous comparison. Thus, even when there is change in a flip area for which it is not previously determined whether image data are different or the same, that change may be detected.

B. Modifications

The preceding description, describing the embodiments and modifications of the disclosure, has been presented only to illustrate and describe the various embodiments of the disclosure with reference to the accompanying drawings, but does not limit the scope of the disclosure. It will, however, be evident that various modifications, changes, and improvements may be made, and additional embodiments may be implemented, without departing from the spirit and scope of the disclosure as defined in the appended claims, and the equivalents are expressly included in the spirit and scope of the disclosure. For example, the following seven modifications may be made to the various previously described embodiments of the image processing apparatus and should therefore be included in the spirit and scope of the claims and disclosure.

B-1. Modification 1

Figures 14A, 14B, 14C, 14D, 14E, 14F:
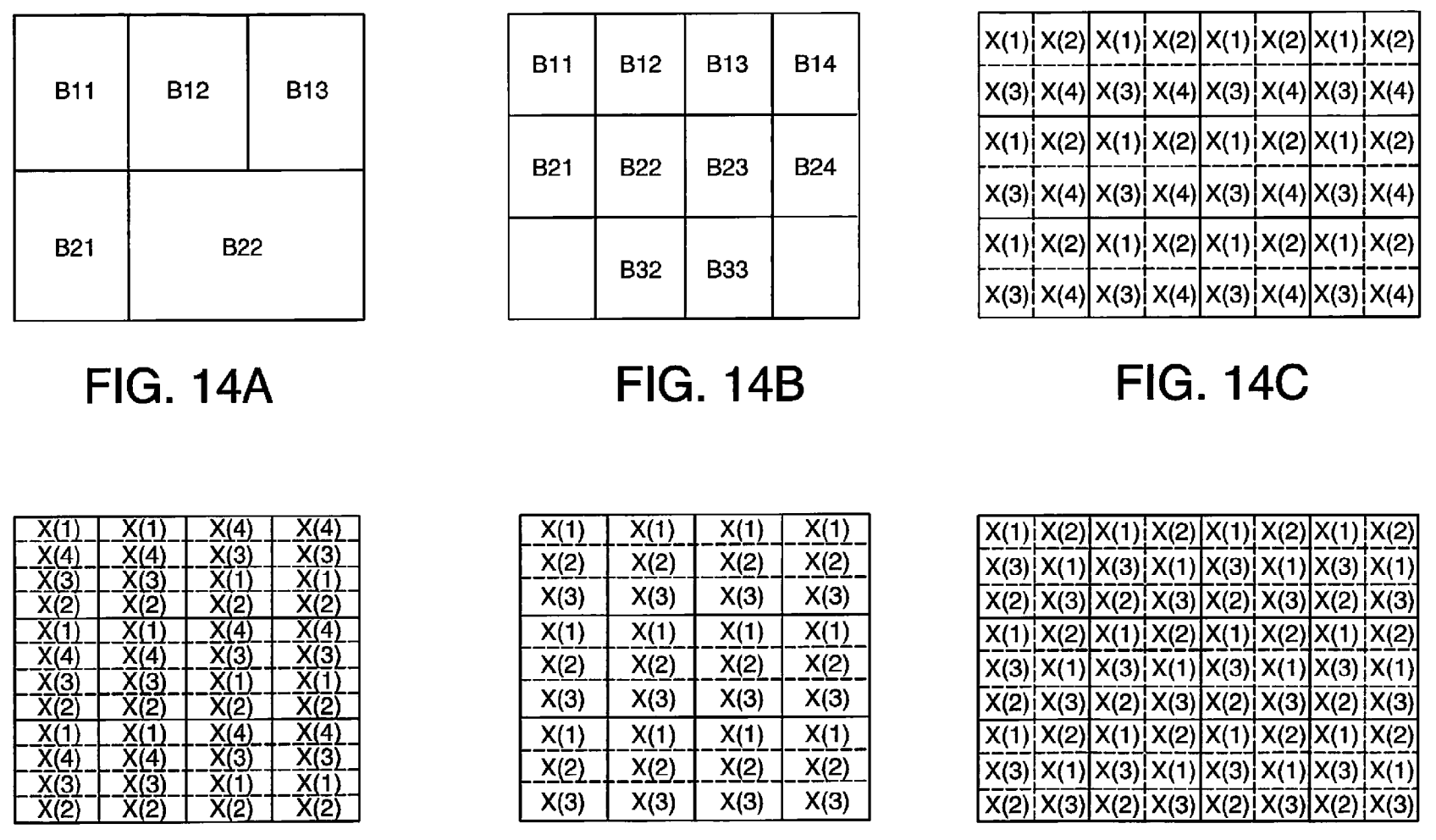

FIGS. 14A to 14F are explanatory views of block areas and flip areas in modified embodiments. In the above embodiment, the area frame data includes 12 block areas. However, the number of block areas forming the area frame data may be increased or decreased, as shown in FIG. 14A. Moreover, the size and shape of each block area may be different from each other.

B-2. Modification 2

The area frame data in the above embodiment includes the same areas as the frame image data drawn in the VRAM 131. However, the area frame data does not need to include all the areas of the frame image data drawn in the VRAM 131, as shown in FIG. 14B.

B-3. Modification 3

In the above embodiment, the flip areas X(1) to X(4) in each block area are vertically arrayed in one line. However, the layout and shape of flip areas in the block areas may be modified, as shown in FIG. 14C.

B-4. Modification 4

In the above embodiment, the flip areas X(1) to X(4) in each block area are arrayed in order. However, the order of flip areas in the block areas may be changed, as shown in FIG. 14D.

B-5. Modification 5

In the above embodiment, each block area includes the four flip areas X(1) to X(4). However, the number of flip areas in each block area may be changed, as shown in FIG. 14E. Also, the size of each flip area may be different from each other.

B-6. Modification 6

In the above embodiment, the flip areas X(1) to X(4) are collective in each block area. However, two or more areas may form one flip area, as indicated by flip areas X(1) to X(3) shown in FIG. 14F.

B-7. Modification 7

In the above embodiment, a part of the configuration realized by hardware may be replaced by software. Likewise, a part of the configuration realized by software may be replaced by hardware.

What is claimed is:

1. An image processing apparatus determines whether a reference image and an image of interest are different or the same, the apparatus comprising:
    a determination unit configured to determine whether a comparative image formed by a part or entirety of the image of interest and an image corresponding to the comparative image in the reference image are different or the same;
    a decision unit configured to decide whether a next comparative image should be a part or entirety of the image of interest in accordance with the result of the determination; and
    an acquisition unit configured to acquire the comparative image from the image of interest in accordance with the decision.

2. The image processing apparatus according to claim 1, further comprising an update unit configured to update the reference image in accordance with the result of the determination, wherein when the comparative image and the reference image are determined to be different, the determination unit determines whether the reference image updated by the update unit and a next comparative image are different or the same.

3. The image processing apparatus according to claim 1, wherein when determined by the determination unit that the comparative image and the reference image are the same, the decision unit decides a part of the image of interest as a next comparative image, and when determined that the comparative image and the reference image are different, the decision unit decides the entirety of the image of interest as the next comparative image.

4. The image processing apparatus according to claim 2, wherein when the comparative image determined as being different or the same by the determination unit is the entirety of the image of interest, the update unit updates the reference image by using the comparative image.

5. The image processing apparatus according to claim 1, wherein when a part of the image of interest is decided as the comparative image, the decision unit decides one of plural divided areas of the image of interest that is divided in the divided areas, as the comparative image.

6. The image processing apparatus according to claim 5, wherein when determined by the determination unit that the comparative image formed by one of the divided areas is the same as the reference image, the decision unit decides a different divided area from the divided area used for the determination, as a next comparative image.

7. The image processing apparatus according to claim 1, wherein the image processing apparatus determines whether an overall image of interest formed by plural images of the images of interest and an overall reference image formed by plural images of the reference images are different or the same.

8. The image processing apparatus according to claim 7, wherein when determined by the determination unit that the comparative image and the reference image are different in at least one or more images of interest forming the overall image of interest, the update unit updates all the reference images forming the overall reference image.

9. The image processing apparatus according to claim 1, wherein the acquisition unit selects an image of interest from plural images arrayed in time series.

10. The image processing apparatus according to claim 1, further comprising a transmission unit configured to transmit the reference image to outside.

11. A computer-implemented image processing method of determining whether a reference image and an image of interest are different or the same, at least a portion of the method being performed by a computing device comprising at least one processor, the method comprising:

determining whether a comparative image formed by a part or entirety of the image of interest and an image corresponding to the comparative image in the reference image are different or the same;

deciding whether a next comparative image should be a part or entirety of the image of interest in accordance with the result of the determination; and acquiring the comparative image from the image of interest in accordance with the decision.

12. A non-transitory computer-readable recording medium having recorded thereon a computer program comprising instructions executable by a computing device comprising at least one processor for determining whether a reference image and an image of interest are different or the same, the computer program being adapted to cause the computing device to perform the functions of:

determining whether a comparative image formed by a part or entirety of the image of interest and an image corresponding to the comparative image in the reference image are different or the same;

deciding whether a next comparative image should be a part or entirety of the image of interest in accordance with the result of the determination; and acquiring the comparative image from the image of interest in accordance with the decision.

* * * * *